April 8, 1941.  J. D. FRANCISCO  2,237,524
TIRE INFLATION SIGNAL
Filed March 16, 1939

Inventor,
J. D. Francisco,
By Robert M. Pierson,
Attorney

Patented Apr. 8, 1941

2,237,524

UNITED STATES PATENT OFFICE 2,237,524

TIRE INFLATION SIGNAL

John D. Francisco, Akron, Ohio, assignor to The Signal-Air Company, Akron, Ohio, a corporation of Ohio Application March 16, 1939, Serial No. 262,135

5 Claims. (Cl. 200—58)

This invention relates to pneumatic tire air-pressure signal apparatus, and its general object is to provide an improved pressure-responsive electrical switch device mountable on the wheel rim, for controlling a signal circuit to automatically notify the driver when tire pressure falls below a predetermined amount. While many such devices have previously been proposed, none has been commercially successful, so far as I am aware.

Among the particular objects of my invention are to provide a radially compact, simple, easily adjusted, dependable and inexpensive switch device for that purpose, and a further object is to make such a device mountable and demountable from the outside or inner periphery of the wheel rim, without requiring removal of the tire.

Of the accompanying drawing.

Figure 1:
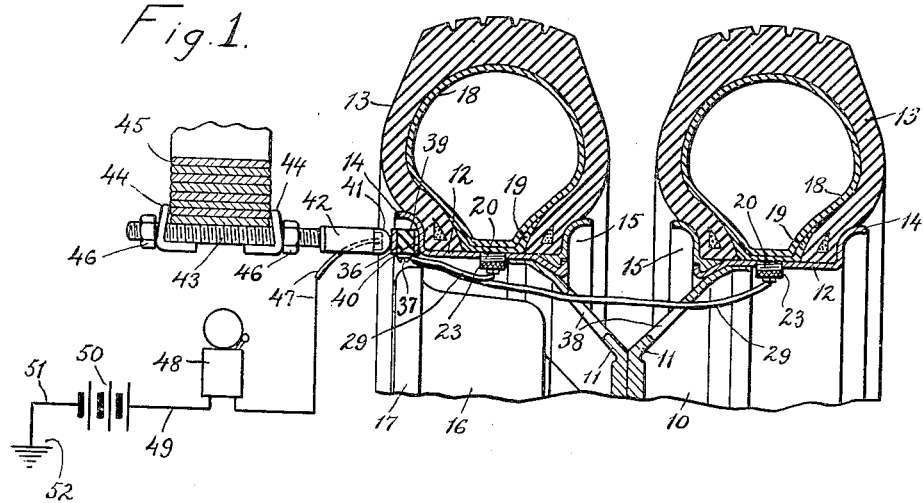
Fig. 1 is a cross-sectional and partly diagrammatic view of part of a vehicle wheel with dual tires thereon, and cooperating structure, showing a preferred form of my invention included in a signal circuit.
Figure 2:
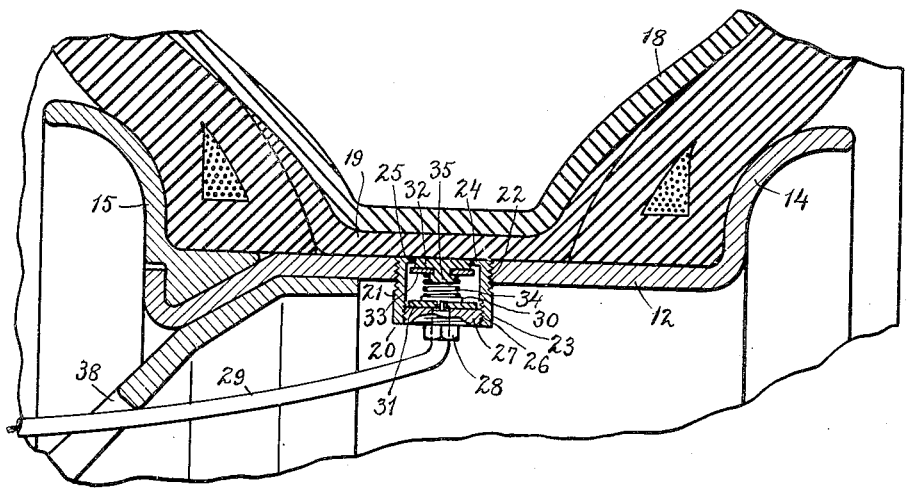
Fig. 2 is an enlarged cross section of the tire base and part of the wheel, including rim, with the switch device applied thereto.

In the drawing, 10 is a dual-tire disk wheel of the type employing a pair of cup-shaped, peripherally flanged members 11 each having welded thereto the base 12 of a rim for supporting a beaded pneumatic tire 13. Said rim has an integral bead-retaining flange 14 on the side remote from the wheel hub, and a detachable bead-retaining flange 15 on the side nearest the hub. At the inner side of the wheel is the usual rotatable brake drum 16, attached thereto, and a non-rotatable brake-shoe plate 17 embracing the periphery of said drum. Each tire is shown with an inner tube 18 and a protective rubber flap 19 between the rim base, casing beads and inner tube, bottom-seated on said base, as customarily employed in tires for heavy vehicles.

20 designates the pressure-responsive switch device as a whole, mounted on the rim base 12 about mid-way of the bead flanges, so that its plunger may contact with the flexible middle portion of the tire flap 19. Said device has an outer tubular casing body 21, made of non-rusting metal such as brass, externally threaded at 22 at one end to screw in a complemental tapped hole in the rim, substantially flush with the flap seat and having a knurled portion 23 at its opposite end, as best seen in Fig. 1, to assist in screwing it in or out.

At its inner end, the casing body 21 is integrally formed with an internal ledge or flange 24 which constitutes the fixed electrode surrounding a central plunger aperture 25, and is grounded on the rim which electrically connects with the vehicle frame. At its outer end, said body is internally threaded at 26 to engage a complemental external thread on a thin spring adjusting plate or plug 27 which forms an outer end closure for the casing. Said plug has a central boss 28 externally squared to receive a wrench or spanner for turning it. The plug is centrally apertured through said boss for the passage of an insulated switch wire 29. The inner end of the wire is soldered to a metallic spring backing disk 30 which loosely overlies an insulating disk 31 centrally apertured for the passage of the wire core.

32 is a button or plunger of insulating material such as hard rubber, projecting through the guide aperture 25 in the electrode flange 24 to contact with the inner periphery of the flap 19, or directly with the base of the inner tube 18 when no flap is present, and thus to act as the pressure-sensitive element or feeler of the switch device. At the back of the head of this plunger is fastened a metal washer 33 of larger diameter, constituting a movable electrode adapted to coact with the fixed electrode flange 24, and yieldingly urged toward the latter by a short helical spring 34. The latter is interposed between said movable electrode and the backing disk 30 and acts as an electrical conductor between the two. The plunger 32 may be molded upon the washer 33 and attached thereto by a reduced neck passing through its central aperture and an inner rivet head 35 of the plunger material, which head acts to center the inner end of the spring 34. It will be evident that, by adjusting the plug 27 in or out, the critical tire pressure to which the movable electrode 33 will respond may be raised or lowered. When the switch is closed, the button 32 projects narrowly above the rim base, but not enough to interfere with the passage of the inner tire bead thereover in mounting and demounting the tire.

The remaining member of the wheel part of the switch circuit is an insulated revolving metallic contact or striker plate 36 externally carried on the rim flange 14 of the tire at the inner side of the wheel and connected by a binding screw 37 with the switch wire 29. Where there are dual tires as shown in Fig. 1, the switch wire 29 of the outer tire may be led across through wheel-web apertures 38 to the same or a duplicate binding screw 37. The striker plate 36 is vulcanized upon an intermediate member 39 of insulating material such as soft rubber, which further acts to some extent as a cushion and is in turn vulcanized upon a metallic backing plate 40 attached to the rim flange 14.

41 is a round-headed metallic brush or electrode mounted on a relatively stationary part of the vehicle in the path of the striker plate 36 and carried by a flexible insulating stem 42 of soft rubber, to which it is vulcanized, so that said brush may yield slightly in a circumferential direction when contacted by the striker plate 36. The inner end of this stem is vulcanized upon the outer end of a horizontal screw rod 43. The latter carries a pair of slidable angular clamping jaws 44 of slightly V-shaped section, for gripping the sides of an adjacent leaf axle-spring 45, and a pair of nuts 46 for adjustably setting these clamping jaws against the spring sides, with the rod 43 so positioned that the brush contact 41 will be at the desired lateral position in relation to the striker contact 36.

47 is an insulated wire having its outer end electrically connected with the brush contact 41 and its adjacent portion embedded in the rubber stem 42 and emerging slantingly from the latter to connect at its inner end with a suitable signal. Said signal is preferably an audible one of any suitable type such as an ordinary electric bell 48 having a vibrator magnet whose other side is connected in series through a wire 49 with the storage battery 50, and the latter through another wire 51 with a ground 52 on the vehicle frame. Thereby, when a lowered tire pressure closes either tire switch 20, a circuit is completed when the contacts 36 and 41 come together.

In the operation of my invention, the adjusting plug 27 for the switch plunger spring is so set that, at a predetermined minimum tire pressure such as 70 pounds per square inch or other desired pressure, the base of the tire tube and flap will yield to the pressure of the spring-backed plunger 32 and the electrodes 24 and 33 will be brought together so that the bell 48 will be intermittently sounded as the revolving brush 41 contacts with the striker plate 36, thus notifying the driver that the affected tire should be reinflated, or removed and replaced if it has been punctured or blown out.

The proper use of devices of this type adds to driving safety, increases the life of pneumatic tires and tends to prevent the overloading of one of a pair of dual tires on a wheel when pressure in the other has become subnormal. In the described switch device 20, it will be noted that the electrodes 24 and 33 are contained within the thickness of the rim base 12. This is an important feature in obtaining a switch device of relatively small radial dimension which can be accommodated, together with a circuit wire or wires 29, in the most restricted space between the rim base 12 and the brake casing 16, 17 which may be encountered. Other features contributing to the desired thinness are the described specific combination of plunger, movable electrode and spring backing and centering parts, and the use of an adjusting screw plug 27 which, except for its boss 28, may telescope entirely within the casing body 21. An advantage incident to the described mode of mounting and demounting the device 20 from the outside or inner periphery of the rim base is that it avoids an objectionable protuberance between said rim base and the tire flap or inner tube, promotes an easy application and removal, and reduces the number of devices required for a given complement of tires by permitting an exchange from tires where the use of the switch is not required. The device is particularly useful in connection with running tires which are so remote from the driver's seat that he might not otherwise promptly become aware of one which is underinflated or deflated.

It will be understood that some variation of the described embodiment is possible within the scope of the appended claims.

I claim:

1. In tire-signal apparatus, the combination of a pneumatic-tire rim including a base wall formed with an aperture, and a switch device mountable on the rim from its inner periphery, having a casing detachably engaged at one end with the walls of said aperture and formed with a mouth aperture, said device having a plunger button of smaller diameter than the rim aperture, guided in the casing mouth aperture and exposed for contact with the base of the tire flap or inner tube, and a pair of internal switch contacts positioned within the thickness of said base wall and including a movable contact actuated by said button.

2. Apparatus according to claim 1 in which the rim is of the straight-side, flat-base type having a flap or tube seat substantially flush with the mouth rim of the switch casing, permitting the inner tire bead to pass over said mouth rim and the plunger button in mounting and demounting the tire.

3. A tire-signal switch device comprising a tubular metallic casing body formed at one end with an externally-threaded rim-engaging portion and an inwardly-directed apertured terminal switch-contact flange within the zone of the threaded portion, a flap or inner-tube contact button in the flange aperture, and a movable switch contact carried by the button, also positioned within said zone so as to come within the bottom wall thickness of a rim base in which the casing may be screwed.

4. Apparatus according to claim 3 in which the contact button is composed of insulating material, rearwardly formed with a spring-centering head, and a helical spring conductor surrounds the head and engages the movable contact.

5. A tire-signal switch device comprising a tubular metallic casing body externally formed at one end with an attaching screw thread and an apertured internal switch-contact flange at the same end, within the zone of the thread, said casing being formed at the opposite end with an internal thread, an apertured internal spring-adjusting plug engaging the internal thread, a conductor wire through the aperture of the plug, having a terminal conductive plate and an insulating disk between the plate and plug, an insulating flap or tube-engaging button in the flange aperture, a conductive switch-contact washer on the button, and a conductive spring interposed between said conductive plate and washer.

JOHN D. FRANCISCO.